June 6, 1972  R. P. FRITSCH  3,667,733
DEVICE FOR THE PLASTICATION OF POWDERY PLASTIC MATERIALS
Filed Jan. 27, 1971  5 Sheets-Sheet 5

United States Patent Office 3,667,733
Patented June 6, 1972

3,667,733
DEVICE FOR THE PLASTICATION OF
POWDERY PLASTIC MATERIALS
Rudolf Paul Fritsch, Goslarer Str. 58,
Stuttgart-Weilimdorf, Germany
Filed Jan. 27, 1971, Ser. No. 110,115
Claims priority, application Germany, Jan. 28, 1970,
P 20 03 593.2
Int. Cl. B01f 7/08
U.S. Cl. 259—6            17 Claims

ABSTRACT OF THE DISCLOSURE

A device for the pressureless plastication of powdery plastic materials, which can be used in front of a conventional single screw extruder, and which includes two axially parallel screws, located in a housing and having an essentially identical flight gradient, which almost completely engage into each other and can be rotated in the same direction. Each screw is shaped to provide sealing ridges which close the conventional screw threads and which engage with correspondingly shaped passageways provided in the flights of the adjacent screw, whereby the plastication can be carried out with only partially filled screw threads, and a constant sealing engagement of the screws is insured. The trapped air and the developing gases can escape through vapor outlets provided in the housing.

The present invention relates to a device for the pressureless plastication of powdery thermoplastic or thermosetting plastic materials, such plastication being achieved by means of two axially parallel screws which have an essentially identical flight gradient, which at least almost completely engage into each other, and which can be driven in the same direction of rotation.

A high percentage of thermoplastic and thermosetting plastics are first obtained in powder form before being conveyed to subsequent processing steps. By interposing a so-called compounding process before the final processing, these powdery plastics are transformed into granules or pellets in specially developed twin screw extruders by applying heat, shearing forces and pressure to them, after which they are finally fed to relatively simple single screw extruders for the final processing. Heretofore, preferably granules or pellets have been processed because the relatively large volume required for the transport of the powdery plastics when supplying the end processors was undesirable, and also because the granules permitted a dust-free end processing. In addition, it was believed that during the process of transformation from the powder to the granules using a compounding process in twin screw extruders, a homogenization of irregularly polymerized products could be achieved, so that a certain refinement of the product was obtained. In the meantime, however, polymerization processes have been improved to such a degree, that at the present polymers can be produced which are much more uniform and of a better quality than those heretofore produced; thus the compounding process is of much less significance, as an interposed refinement step prior to the end processing, than it was before. Further, the ability to transport the powders by means of containers also reduces the significance of the unfavorable specific volume of powders with respect to granules or pellets.

At present, the compounding process is considered undesirable or even detrimental primarily for the reason that particularly high molecular polymers should be treated so carefully as possible in order to protect their resistance properties against any change or damage. Further, the compounding process requires high expenses in the erection, servicing and maintenance of the compounding installation, which have proved to result in at least 10 DPfg. (about 2.7 cents) per kilogram of processed plastic.

So-called single screw extruders, and machines with piston injection into the mold and provided with single screw preplastication devices, have prevailed in the end processing of plastic granules because they are of simple construction, do not require considerable operation and maintenance expenses and are of relatively low initial cost and, particularly, also because the granules have only to be melted and processed under the effect of pressure and shearing forces. Due to the disadvantages connected to the compounding process the manufacturers of the above mentioned machines have made extended efforts to develop devices which would permit to process the cheaper plastic powder instead of the granules, but no visible success has yet been attained. It has been found that the large air quantities contained in the powdery plastics, and the gaseous components which develop during the process of plastication (plasticization) hinder an accurate feed in single screw machines. These gases not only cannot be pressurized to the pressure required for plastication because of the lack of a forced transport in this type of screw device, but also they escape through the way of least resistance toward the feed-hopper for the plastic powder, taking along with them powder which had already been seized by the screw, thus partially emptying the screw. The result is that the machines begin to pulsate, continuous processing thus being made impossible. It has been proposed to arrange a venting zone along the feed screw and behind the plastication zone to provide a possibility for escape of the trapped air and vapors which develop during the plastication. In practice it has been found, however, that even these machines still tend to pulsate, since the venting openings cannot be arranged at the most suitable places due to the manner of operation. These basic considerations demonstrate that it is, in effect, impossible to plasticate in single screw machines, since these machines cannot subject the processing material to the required pressure because of the trapped air and the developing gases. This pressure is necessary to obtain the required shearing energies from the relative movement between the screw and the housing, which would be transformed into heat, and could heat the processing material to achieve its plastication.

The object of the present invention consists in providing a device which makes it possible to plasticate powdery plastics in an inexpensive way and by carefully treating the material.

This object can be realized, according to the invention, by means of a device of the type above described, for the pressureless plastication of powdery plastics, which is characterized in that each screw thread defined by successive screw flights of a screw is closed by a sealing ridge extending along the outer periphery of the screw, and the adjacent screw is provided with a passageway shaped so as to engage with said sealing ridge and interrupt the screw flight of said adjacent screw at the place which corresponds to the meeting place with said sealing ridge during rotation of both screws. The device according to the invention is particularly suitable when placed in front of single screw extruders and injection molding machines with single screw preplastication devices. The plastic powder to be processed is not subjected to any axial pressures, and the screws which are completely filled at the feeding inlet of the powdery plastic become gradually less filled in the feeding direction of the screws due to the decrease in volume caused by the plastication process, so that the inlet and the outlet of the device according to the invention communicate with each other, with respect to gaseous mediums, during the operation of the device, and the air contained in the powder and the gases which develop during the process of plastication can therefore escape.

According to an advantageous embodiment of the invention, at least one vapor outlet is located in the housing of the screws and above said screws, being preferably arranged upstream of the outlet for the plasticated plastic material. Thus, the gases are taken along in feeding direction of the screws and can escape through the vapor outlet before reaching the feed opening of the single screw extruder located underneath.

Both screws of the device according to the invention are shaped in such contours that they constantly provide a sealing engagement, in other words, they provide at each place a sealing profile, since every sealing ridge provided on one screw engages with a correspondingly shaped passageway provided on the adjacent screw.

According to a preferred embodiment of the invention the screws are multiple-threaded, particularly triple-threaded. Further, it has been found to be suitable to provide each screw with an alternative succession of two different kinds of screw sections. The one of these sections has a conventional screw form defined by screw flights and is provided with sealing ridges closing the screw threads. The second one of these sections is provided with passageways at the screw flights at those places which are determined by the sealing ridges of the adjacent screw. Each one of these sections in one screw engages with a section of the opposite type in the adjacent screw.

It is apparent that the shearing forces required for the plastication can be produced in spite of partially filled screws by the fact that a sealing ridge and an adjacent screw flight define a wedge-shaped space together with the housing which surrounds the screws, so that the material to be processed is subjected to radial forces which produce the required shearing effect to initiate the plastication process.

When the embodiment comprises the arrangement of the screws in a housing which is provided with two cylindrical spaces to receive said screws, the diameter of which spaces corresponds to the outer diameter of the screws, it is preferable to design the outer diameter of the screw flights and of the sealing ridges in such a way that it gradually and slightly decreases in feeding direction toward the point at which said screw flight and the corresponding sealing ridge meet under a sharp angle, so that a gap with a gradually increasing width is provided between the screw flight and the sealing ridge on one side and the inner surface of the housing on the other side. The material to be processed is forced to flow through this wedge-shaped gap, particularly in such a way that the quantity of material contained in one screw thread is subdivided in two equal parts, one of said parts of the material remaining in the same screw thread, but the second of said parts being pushed into the adjacent screw thread located upstream. Thus, in spite of the partially filled screws a mixing process is superposed to the actual plastication process. It is known that the mixing process is still one of the advantages in known compounding processes; however, in the plastication device according to the present invention, the mixing process adds to the other mentioned advantages.

Preferably, the housing designed to receive both screws is formed of a material with a high heat conductivity, and the cylindrical spaces can be surrounded by cooling channels and/or heating elements. If the housing is made of casting the tubes for the electrical heating elements or the cooling pipes can be directly cast in.

Depending on the material which is to be processed the housing can be differently formed. It is either possible to coat the inner surfaces of the cylindrical spaces with a wear-resistant layer, particularly a chromium layer, or the spaces may be determined by liners arranged inside the housing. Wear-liners of this type can be cast in simultaneously with the pipes for the heating elements and for cooling. Such a structure is made possible because relatively small specfic forces are effective and no axial forces appear at all in the device according to the invention, so that the device can also be relatively light built.

In consideration of the fact that both screws are gradually less filled in the feeding direction, an increase of the maximal quantity of powder to be processed can be attained by conforming both screws of the plastication device symmetrical with respect to a discharge opening of the housing in which they are located, in such a way that each screw is provided with a right-handed thread portion and a left-handed thread portion, both said portions meeting over the discharge opening. Of course, when the disadvantage represented by using two drive means is ignored, two separate pairs of screws can also be arranged at both sides of the discharge opening. Such a plastication device is fed at both ends and delivers the plasticated plastic at the middle.

Further objects and details of the invention will result from the attached claims and/or from the following description of a preferred embodiment of the device according to the invention, with reference to the accompanied drawings, in which:

Figure 1:
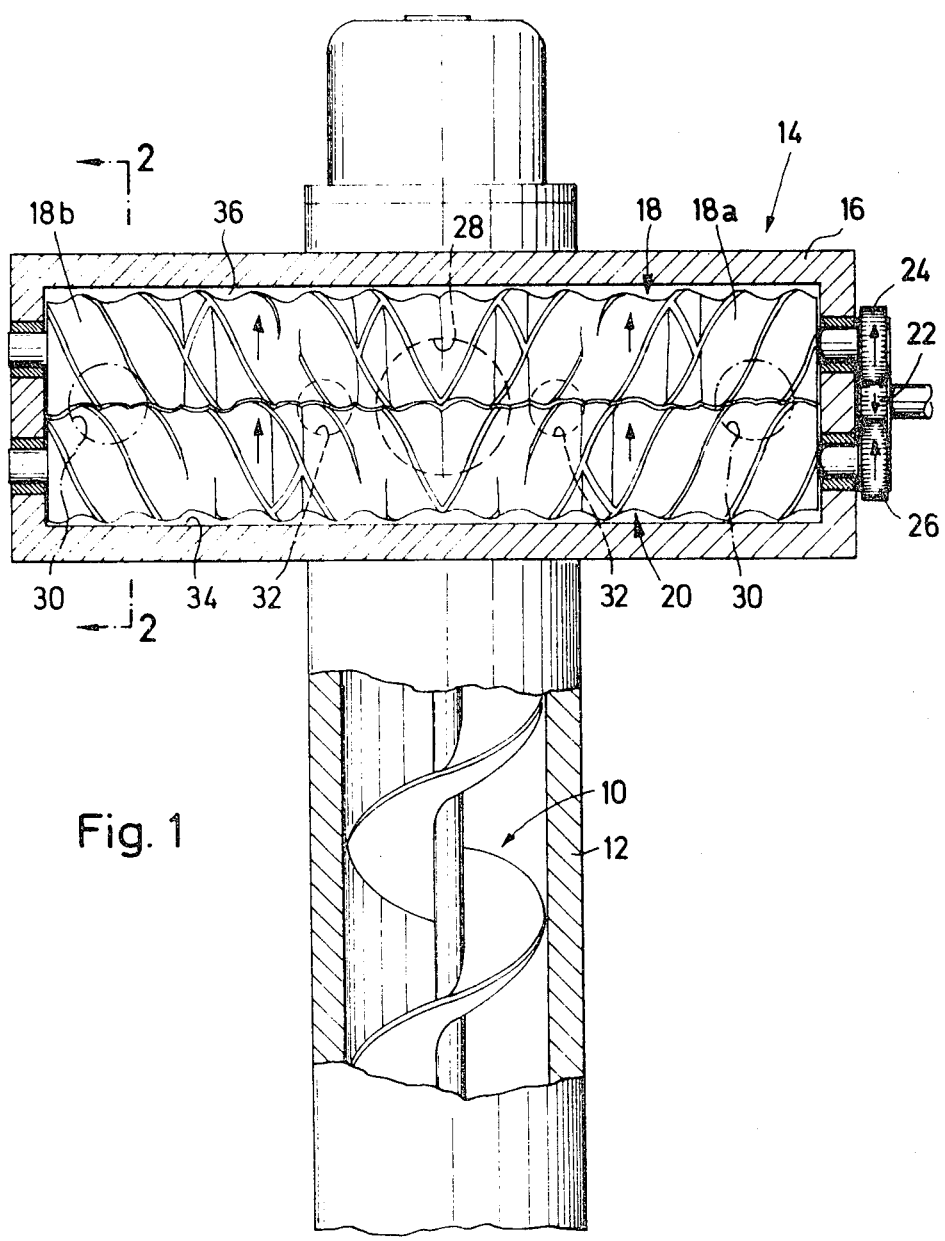
FIG. 1 shows a top view of the feed screw of a single screw extruder, for example, with a plastication device according to the invention arranged on top of said extruder, the housing of said device being shown in section and the housing of the feed screw partially in section.

FIG. 1 shows a feed screw 10 with a corresponding housing 12, of such a type which can be arranged in a single screw extruder or in an injection molding machine. A plastication device 14, according to the invention, is mounted on said housing 12 and transversally arranged to the longitudinal direction of the feed screw, and comprises a housing 16 and two parallel screws 18 and 20 which are rotatably supported in housing 16 and can be driven in the same direction by a gear means including a drive pinion 22 and two toothed wheels 24 and 26.

In the middle portion of the plastication device 14 according to the invention a discharge opening 28 is located at the bottom of the housing and indicated in FIG. 1 by means of a dashed line, said discharge opening coinciding in the drawing with a feed opening located in the housing 12 of the feed screw 10. Both screws 18 and 20 are symmetrically shaped with respect to said discharge opening or to the longitudinal axis of the feed screw 10, i.e. the screw 18 has on the right part of FIG. 1 a left-handed thread portion 18a and on the left part of FIG. 1 a right-handed thread portion 18b, which are completely symmetric to each other. The same can be said with respect to the screw 20. As it is clearly shown in FIG. 1, the profiles of the screws 18 and 20 are so determined as to define a sealing engagement between each other. Of course, the separation between the contours of both screws is not shown in accurate scale in the drawings. The same must be said for the separation of the screws from the housing 16, which will be specified hereinafter.

The device according to the invention is fed at both sides through the feed inlets 30 which are shown in chain-dotted lines since they are located in the upper half of the housing. In the zones of the feed inlets both screws are conventionally shaped, that is, they are provided neither with sealing ridges nor with corresponding passageways, but have only conventional screw flights. The screws 18 and 20 feed the material from the outer zones inwardly; that is, from the feed inlets 30 toward the discharge opening 28, if they are both driven in clockwise directions, when seen from the right side of FIG. 1. Upstream of the discharge opening 28 a so-called vapor outlet 32 is located at each side and in the upper half of the housing 16. This vapor outlet is also shown by means of dash lines and has the purpose to permit the air pressed out of the plastic powder being processed and the gases which develop during the plastication to escape to the outside of the device.

Figure 2:
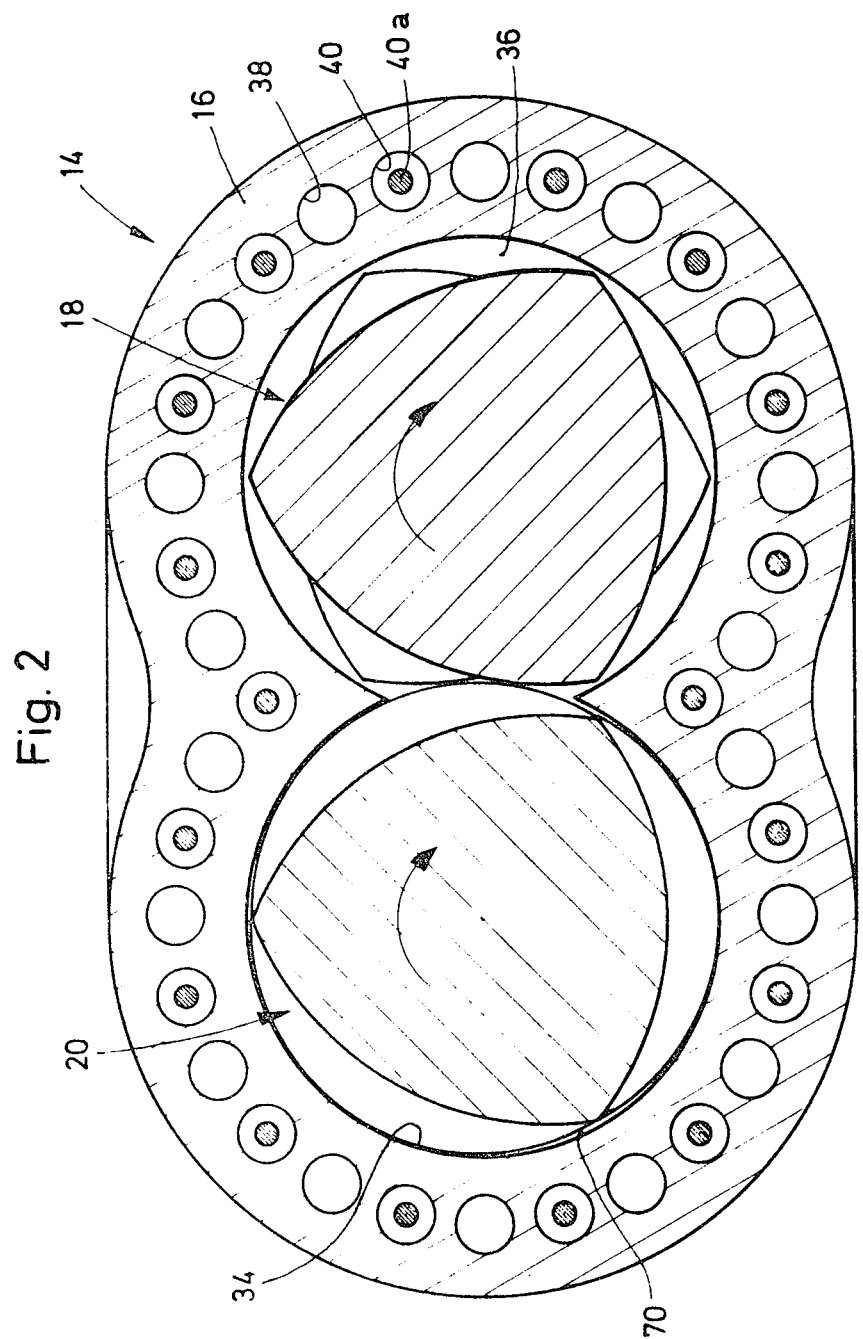
FIG. 2 shows a sectional view of the device according to the invention, along line 2—2 of FIG. 1.

FIG. 2 shows a sectional view of the plastication device according to the invention, in which it is apparent that the screw flights which define the screw threads of both screws provide a sealing contact with the inner surfaces 34 of two cylindrical spaces 36, said spaces being defined by the housing 16 to locate the two screws 18 and 20. These cylindrical spaces are surrounded by cooling pipes 38 and heating tubes 40 extending in longitudinal direction of the housing 16; a cooling medium can be fed through the cooling pipes 38, whereas the heating tubes 40 may be provided for instance with heating elements 40a which can be heated by electric resistance.

Figure 3:
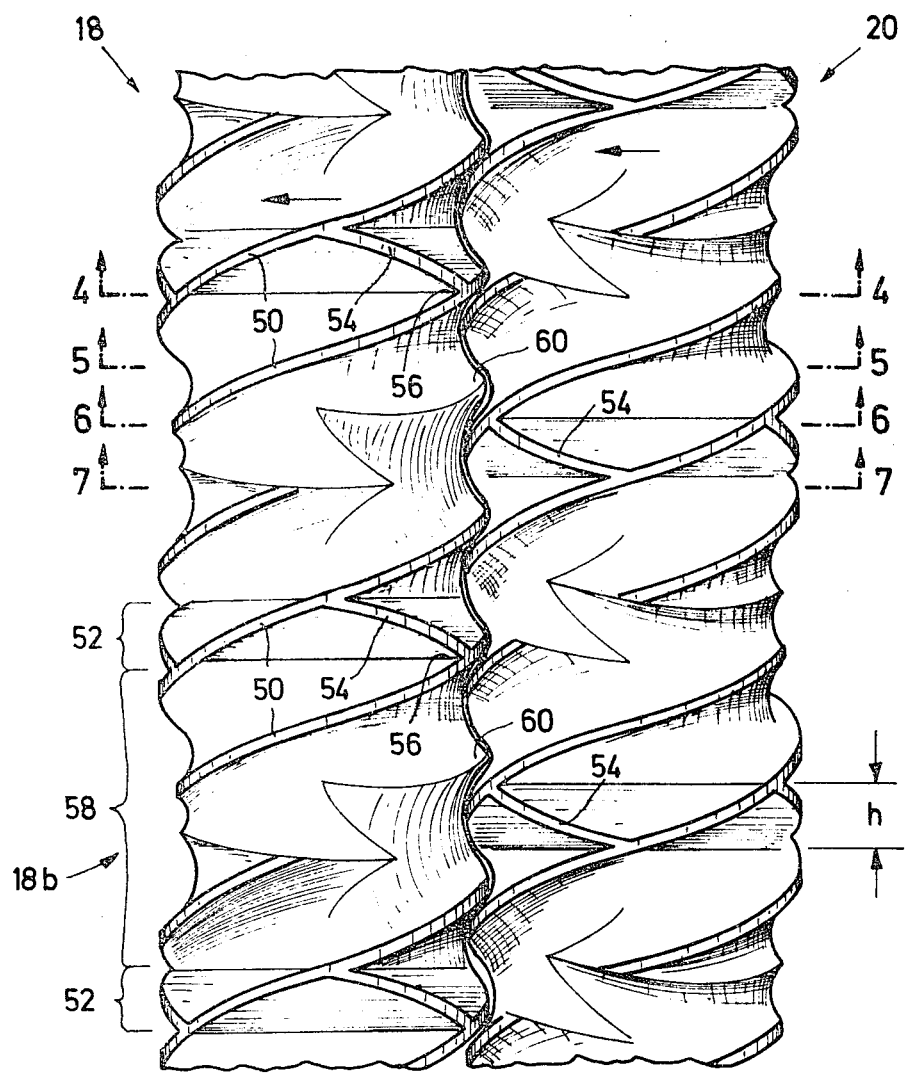
FIG. 3 shows a portion of FIG. 1 at an enlarged scale, showing shape details of part of both screws of the device according to the invention.
Figure 4:
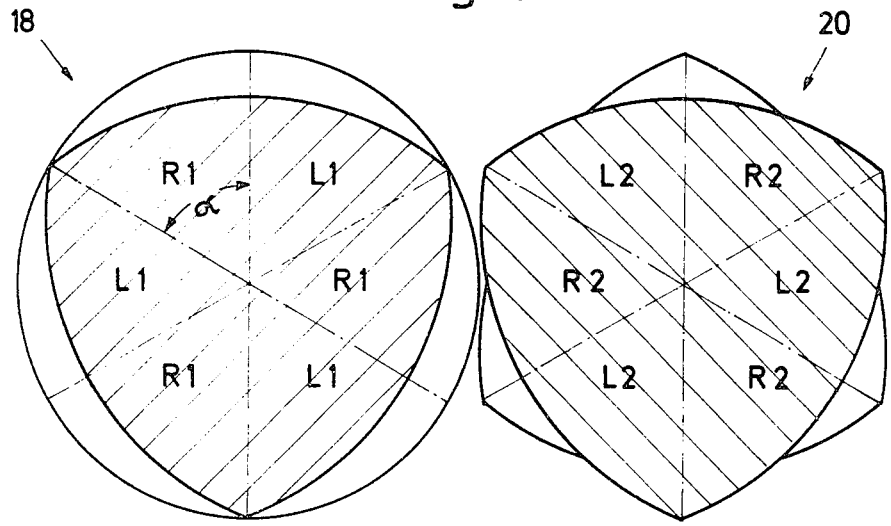
FIGS. 4–7 show sectional views of both screws along the corresponding lines in FIG. 3.
Figure 5:
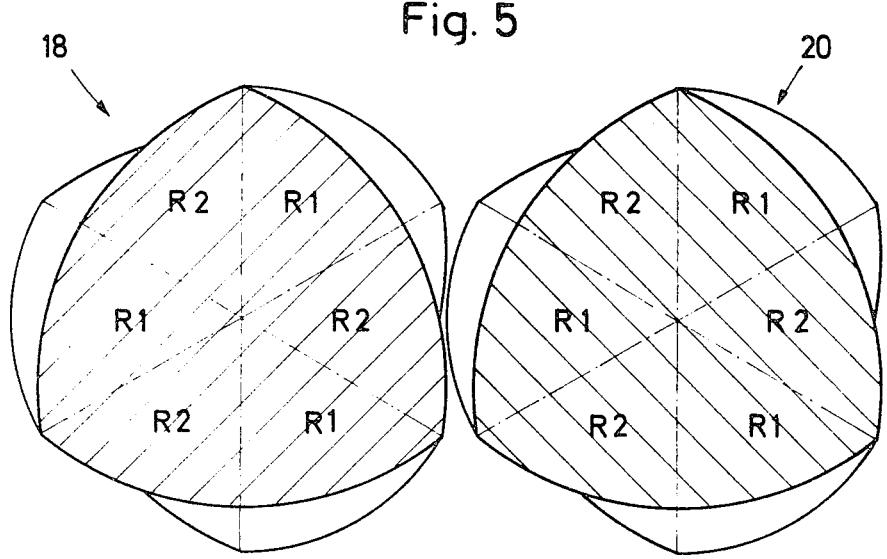
Figure 6:
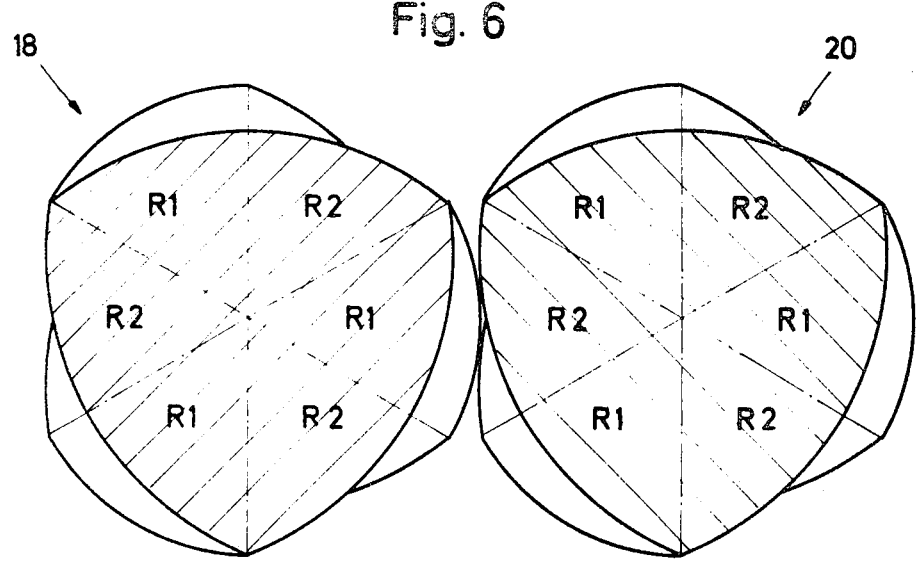
Figure 7:
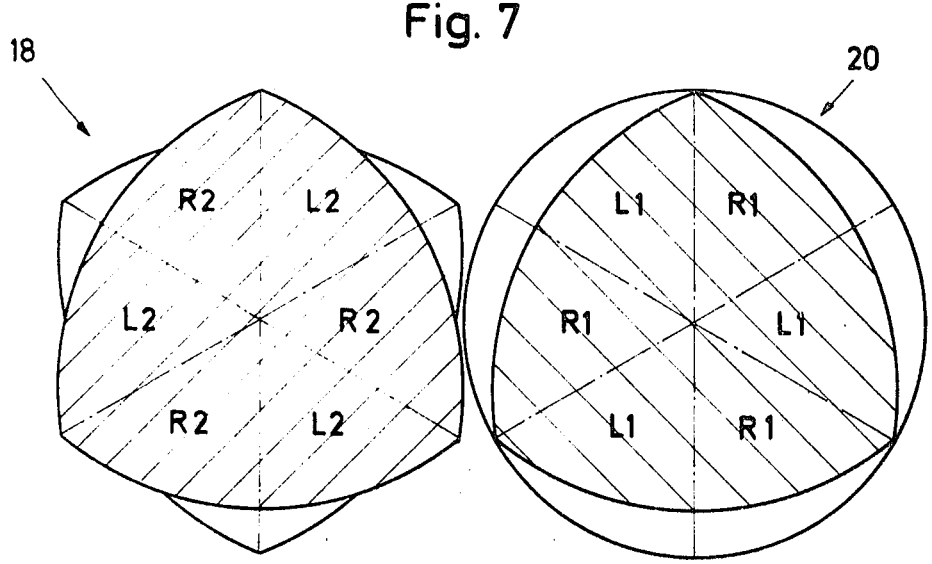

FIG. 3 shows the shape of both screws 18 and 20 in more detail, and only a section of the right-handed thread portions is shown to increase the clarity; moreover, the screws have been rotated approximately 60 degrees in direction of operation with respect to FIG. 1, for purposes of detail.

Both screws 18 and 20 are triple-threaded, and since both have the same profile and the only difference resides in a displacement of the same in longitudinal direction, it is sufficient only to describe in detail the portion shown in FIG. 3 of the right-handed thread portion 18b of screw 18.

The screw is partially provided with conventional screw flights 50 which define the screw threads. In the zone defined by disk-shaped portions 52 each one of the three screw threads defined by said conventional screw flights 50 is closed by respective sealing ridges 54 which determine wedge-shaped spaces 56 together with the screw flights 50 which are adjacent to said ridges 54 in upstream direction. Preferably said sealing ridges 54 are each shaped from a portion of a screw the flight gradient of which is opposite to the gradient of said conventional screw flights 50. Between each two successive disk-shaped portions 52 there is a portion 58 which could correspond to a conventional right-handed thread screw if the adjacent screw 20 did not have sealing ridges 54 in this zone, which require that the screw flights 50 be interrupted in the zones indicated with 60 and corresponding passageways be substituted for said screw flights. Such a conformation permits retention of a sealing profile of both screws, so that for all practical purposes they provide a sealing engagement in every position.

If in the present embodiment the lead of the screws is indicated with S and the number of threads with $n$, the width $h$, that is the extension of the disk-shaped portions 52 in longitudinal direction, will result in:

$$h = S/2n$$

FIGS. 4 to 7 show different sectional views of the two screws. As shown, it can be assumed that each screw is composed of screw sectors distributed both along the axis and around the circumference of the screw; that is, of sectors which are obtained by cutting corresponding right-handed or left-handed screws into disk-shaped portions and again dividing said disk-shaped portions along diameters. Distinction must be made between thread sectors and flight sectors of right-handed and left-handed screws, and in FIGS. 4–7 the following denominations have been chosen:

R1 = right-handed screw flight sector
R2 = right-handed screw thread sector
L1 = left-handed screw flight sector
L2 = left-handed screw thread sector The value of the central angle $\alpha$ of each sector is of $360°/2n$.

As it can be clearly appreciated in FIG. 2, the outer diameter of the screw flights 50 and of the sealing ridges 54 slightly decreases in feeding direction of the screws and toward the apex of the wedge-shaped spaces 56, so that the flight ridges define, together with the inner surface 34 of the spaces 36 of the housing, a wedge-shaped gap which increases in width toward said apex, which is indicated with 70 in FIG. 2. Thus, in addition to the already described operation, a mixing effect of the material to be processed is also achieved since the material compressed in the wedge-shaped space 56 is forced, during the rotation of both screws 18 and 20, to flow through said wedge-shaped gap 70 with the result that the material located in the wedge-shaped space is subdivided in two equal parts, one of which parts remains in the original screw thread defining the wedge-shaped space, whereas the other part of the material is transferred into the adjacent screw thread located upstream. Thus, a mixing process occurs in addition to the plastication process.

The claims are:

1. A device for the pressureless plastication of powdery thermoplastic or thermosetting plastic materials, including a housing, at least two screws being arranged inside said housing, each one of said screws comprising at least one screw flight and at least one sealing ridge, successive turns of said screw flight defining at least one screw thread, said screws being axially parallel, having at least one essentially identical flight gradient, and at least almost completely engaging into each other, each one of said sealing ridges extending along portions of the outer periphery of each one of the screws and closing each one of said screw threads, each one of said screw flights defining at least one passageway interrupting said flight, each one of said passageways being located on each screw at the portion opposite to the corresponding sealing ridge of the adjacent screw, bearing means being provided in said housing to support said screws, and drive means being connected to said screws, whereby the screws can be rotated in the same direction and each of said sealing ridges on one screw engages with the correspondingly shaped passageway on the other screw to provide a constant sealing engagement of said screws.

2. A device as defined in claim 1, wherein said screws are multiple-threaded.

3. A device as defined in claim 2, wherein said screws are triple-threaded.

4. A device as defined in claim 1, wherein said sealing ridges comprise portions of a screw the flight gradient of which is opposite to the flight gradient of the two screws.

5. A device as defined in claim 1, wherein each of said two screws comprises an alternative succession of two different sections, a first section having a conventional screw form defined by successive screw flights and provided with sealing ridges closing the screw threads, and a second section having passageways at positions determined by the sealing ridges of the adjacent screw, and wherein each one of said sections on one screw engages with a section of the opposite kind on the other screw.

6. A device as defined in claim 1, wherein said housing is provided with at least one feed inlet and one discharge opening.

7. A device as defined in claim 1, wherein said housing is elongated and defines two parallel cylindrical spaces extending in longitudinal direction of the housing and being delimited by the inner surfaces of said housing, the diameter of said inner surfaces corresponding to the outer diameter of the screws.

8. A device as defined in claim 7, wherein the outer diameter of the screw flights and of the sealing ridges gradually and slightly decreases in feeding direction toward a point at which the screw flight and the corresponding sealing ridge meet under a sharp angle, thereby providing a gap with a gradually increasing width between the screw flight and the sealing ridge on one side and the inner surface of the housing on the other side.

9. A device as defined in claim 7, wherein said housing is formed of a material with a high heat conductivity, and said cylindrical spaces are surrounded by tubes selected from the group comprising cooling pipes and heating tubes.

10. A device as defined in claim 7, wherein said inner surfaces are coated with a wear-resistant layer.

11. A device as defined in claim 10, wherein said wear-resistant layer is a chromium layer.

12. A device as defined in claim 7, wherein said cylindrical spaces are defined by liners located inside the housing.

13. A device as defined in claim 6, wherein said housing is provided with two feed inlets, each one being located at each upper and outer portion of the housing, and with one discharge opening being located at the under and central portion of the housing.

14. A device as defined in claim 13, wherein the screws are symmetrically conformed with respect to said discharge opening and are each provided with a right-handed and a left-handed thread portion, said portions meeting over said discharge opening.

15. A device as defined in claim 13, wherein said discharge opening is located over the feed inlet of a single screw extruder and the housing is transversally positioned with respect to the axis of said extruder.

16. A device as defined in claim 6, wherein said housing is provided with at least one vapor outlet located above said screws.

17. A device as defined in claim 16, wherein said vapor outlet is located upstream of the discharge opening.

References Cited

UNITED STATES PATENTS

| | | | |
|---|---|---|---|
| 3,122,356 | 2/1964 | Erdmenger | 259—104 |
| 3,423,074 | 1/1969 | Loomans | 259—6 |
| 3,608,868 | 9/1971 | Koch | 259—104 X |

FOREIGN PATENTS

| | | | |
|---|---|---|---|
| 807,186 | 6/1951 | Germany | 259—104 |
| 1,180,718 | 11/1964 | Germany | 259—DIG. 8 |
| 1,214,386 | 4/1966 | Germany | 259—6 |

WALTER A. SCHEEL, Primary Examiner

P. R. COE, Assistant Examiner

U.S. Cl. X.R.

259—DIG. 8, DIG. 18